United States Patent
Bryant et al.

(10) Patent No.: US 9,942,057 B2
(45) Date of Patent: *Apr. 10, 2018

(54) AVOIDING MICRO-LOOPS IN A RING TOPOLOGY OF A NETWORK

(71) Applicants: Stewart Frederick Bryant, Merstham (GB); Clarence Filsfils, Brussels (BE); Ian Michael Charles Shand, Cobham (GB)

(72) Inventors: Stewart Frederick Bryant, Merstham (GB); Clarence Filsfils, Brussels (BE); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,715

(22) Filed: Jun. 18, 2015

(65) Prior Publication Data

US 2015/0288536 A1    Oct. 8, 2015

Related U.S. Application Data

(63) Continuation of application No. 13/269,617, filed on Oct. 9, 2011, now Pat. No. 9,094,329.

(51) Int. Cl.
| | |
|---|---|
| H04L 12/437 | (2006.01) |
| H04L 12/705 | (2013.01) |
| H04L 12/703 | (2013.01) |
| H04L 12/427 | (2006.01) |
| H04L 12/26 | (2006.01) |

(52) U.S. Cl.
CPC ......... *H04L 12/437* (2013.01); *H04L 12/427* (2013.01); *H04L 43/0811* (2013.01); *H04L 45/18* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 5,925,137 A | 7/1999 | Okanoue et al. | |
| 6,301,267 B1 | 10/2001 | Ben-Ami | |
| 6,366,561 B1 | 4/2002 | Bender | |
| 6,711,152 B1 | 3/2004 | Kalmanek, Jr. et al. | |

(Continued)

*Primary Examiner* — Steven H Nguyen
(74) *Attorney, Agent, or Firm* — The Law Office of Kirk. D. Williams (57) ABSTRACT

In one embodiment, micro-loops are avoided in ring topologies of packet switching devices by changing the order of propagation of link state information concerning failed communications between a particular packet switching device and a neighbor packet switching device. In one embodiment, the particular packet switching device communicates link state information of a high cost of the particular communications (e.g., in the direction from particular to neighbor packet switching devices) such that this link state information will propagate towards the particular packet switching device from at least from the furthest packet switching device in the ring topology that is currently configured to forward packets having a destination address of the neighbor packet switching device through the particular packet switching device.

16 Claims, 4 Drawing Sheets

(56) References Cited

U.S. PATENT DOCUMENTS

| | | | |
|---|---|---|---|
| 6,901,048 B1 * | 5/2005 | Wang | H04L 45/02 370/216 |
| 6,963,575 B1 | 11/2005 | Sistanizadeh et al. | |
| 7,197,008 B1 * | 3/2007 | Shabtay | H04L 12/4633 370/218 |
| 7,327,683 B2 | 2/2008 | Ogier et al. | |
| 7,362,709 B1 * | 4/2008 | Hui | H04L 45/00 370/221 |
| 7,496,650 B1 | 2/2009 | Previdi et al. | |
| 7,656,792 B2 | 2/2010 | Zhang et al. | |
| 7,688,756 B2 | 3/2010 | Allan et al. | |
| 7,707,307 B2 | 4/2010 | Miles et al. | |
| 7,792,987 B1 * | 9/2010 | Vohra | H04L 12/4633 370/237 |
| 7,817,580 B2 | 10/2010 | Jain et al. | |
| 7,864,712 B2 | 1/2011 | Khan et al. | |
| 7,889,675 B2 | 2/2011 | Mack-Crane et al. | |
| 8,223,660 B2 | 7/2012 | Allan et al. | |
| 9,094,329 B2 | 7/2015 | Bryant et al. | |
| 2002/0018481 A1 | 2/2002 | Mo et al. | |
| 2002/0027885 A1 | 3/2002 | Ben-Ami | |
| 2003/0016678 A1 | 1/2003 | Maeno | |
| 2003/0108029 A1 * | 6/2003 | Behzadi | H04L 12/437 370/351 |
| 2006/0187819 A1 * | 8/2006 | Bryant | H04L 41/0668 370/216 |
| 2007/0086361 A1 | 4/2007 | Allan et al. | |
| 2007/0127395 A1 | 6/2007 | Jain et al. | |
| 2008/0107018 A1 | 5/2008 | Zhang et al. | |
| 2009/0046576 A1 * | 2/2009 | Shand | H04L 45/00 370/217 |
| 2009/0067322 A1 * | 3/2009 | Shand | H04L 45/00 370/225 |
| 2009/0252033 A1 * | 10/2009 | Ramakrishnan | H04L 12/18 370/228 |
| 2010/0296414 A1 | 11/2010 | Vohra et al. | |
| 2012/0075986 A1 * | 3/2012 | Lu | H04L 45/02 370/216 |
| 2012/0075988 A1 * | 3/2012 | Lu | H04L 45/02 370/218 |
| 2013/0121256 A1 | 5/2013 | Backes | |

* cited by examiner

AVOIDING MICRO-LOOPS IN A RING TOPOLOGY OF A NETWORK

CROSS-REFERENCE TO RELATED APPLICATIONS

This application is a continuation of U.S. patent application Ser. No. 13/269,617, filed Oct. 9, 2011, which is hereby incorporated by reference in its entirety.

TECHNICAL FIELD

The present disclosure relates generally to communicating information in a network including packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

One topology of a network including packet switching devices is a ring topology, in which packet switching devices are communicatively coupled together to form the ring. Routing protocols are used to exchange information for determining how each packet switching device should forward packets in the network. For example, a link-state routing protocol is performed by each packet switching device, in which it builds a connectivity map of the network. Each packet switching device independently calculates the next best logical path from itself to other destinations in the network based on the connectivity map and the associated costs of the links communicatively coupling the packet switching devices. The collection of best paths will then form the node's routing table, which is used in the data plane to forward packets.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with avoiding micro-loops in a ring topology of a network.

One embodiment includes a network, comprising: a plurality of packet switching devices communicatively coupled in a ring topology, with the plurality of packet switching devices including: a particular packet switching device, a neighbor packet switching device, a second neighbor packet switching device, and an intermediate packet switching device; wherein the particular packet switching device and the neighbor packet switching device are neighbors in the ring topology when particular communications is established between the particular packet switching device and the neighbor packet switching device; wherein the particular packet switching device and the second neighbor packet switching device are neighbors in the ring topology; wherein each of the plurality of packet switching devices are configured to exchange link state information and to update their respective local forwarding information accordingly. In one embodiment, the particular packet switching device is configured to cause a particular link state packet, including particular link state information identifying a very high cost of the particular communications for reaching the neighbor packet switching device from the particular packet switching device, to be communicated to the neighbor packet switching device such that said particular link state information is processed by the neighbor packet switching device before any other packet switching device in the plurality of packet switching devices; and wherein the particular packet switching device is configured not to flood said particular link state information to the second neighbor packet switching device.

One embodiment includes a network, comprising: a plurality of packet switching devices communicatively coupled in a ring topology, with the plurality of packet switching devices including: a particular packet switching device, a neighbor packet switching device, a second neighbor packet switching device, and an intermediate packet switching device; wherein the particular packet switching device and the neighbor packet switching device are neighbors in the ring topology when particular communications is established between the particular packet switching device and the neighbor packet switching device; wherein the particular packet switching device and the second neighbor packet switching device are neighbors in the ring topology; wherein each of the plurality of packet switching devices are configured to exchange link state information and to update their respective local forwarding information accordingly; wherein the intermediate packet switching device is configured to forward packets addressed to the neighbor packet switching device to another packet switching device of the plurality of packet switching devices towards the neighboring node and away from the particular packet switching device in the ring topology, or is the furthest packet switching device from the particular packet switching device in the ring topology that is configured to forward packets addressed to the neighbor packet switching device through the particular packet switching device. In one embodiment, the particular packet switching device is configured to encapsulate a particular link state packet, including particular link state information identifying a very high cost of the particular communications for reaching the neighbor packet switching device from the particular packet switching device, and to send said encapsulated particular link state packet to the intermediate packet switching device in response to the particular communications being no longer available between the particular packet switching device and the neighbor packet switching device; and wherein the particular packet switching device is configured not to flood said particular link state information to the second neighbor packet switching device.

2. Description

Disclosed are, inter alia, methods, apparatus, computer-storage media, mechanisms, and means associated with avoiding micro-loops in a ring topology of a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1:
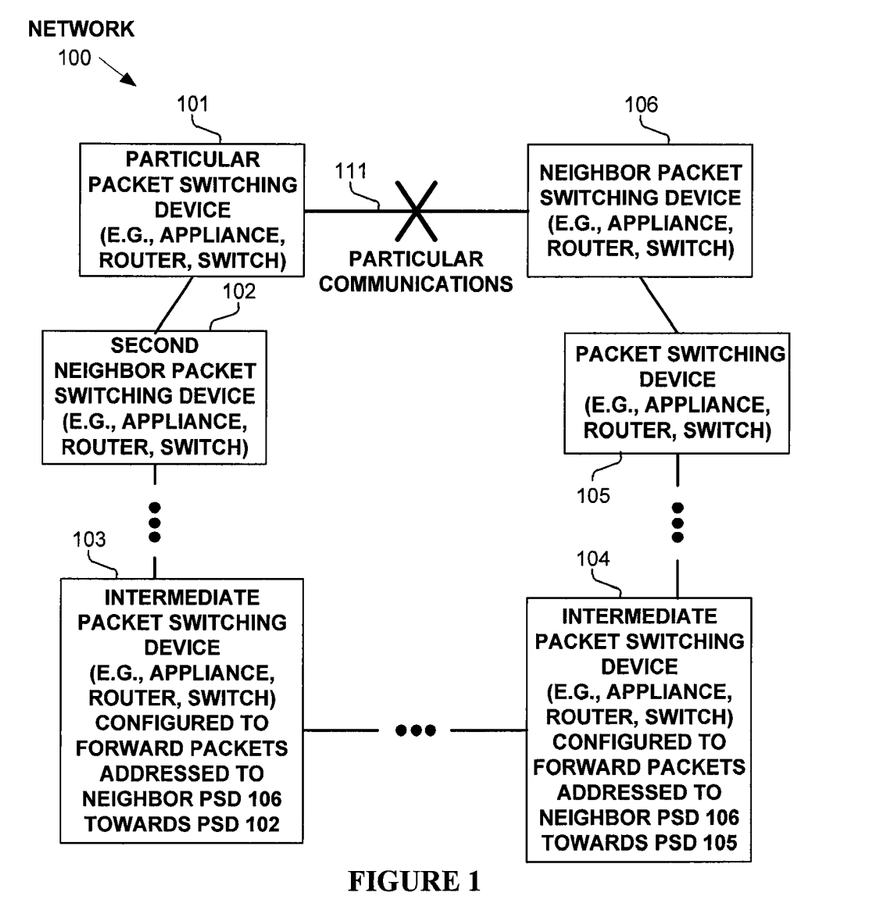
FIG. 1 illustrates a network configured to operate, and/or operating, according to one embodiment.

Expressly turning to the figures, FIG. 1 illustrates network 100, including packet switching devices 101-106 arranged in a ring topology. Note, of course there can be additional packet switching devices in the ring topology, and/or additional packet switching devices connected to one or more of packet switching devices 101-106.

As shown, particular packet switching device 101 is communicatively coupled to neighbor packet switching device 106 via particular communications 111, which is initially functioning in our example network 100 of one embodiment. Additionally as shown, the other neighbor of particular packet switching device 101 is second neighbor packet switching device 102. Intermediate packet switching device 103 is configured (e.g., via a link state routing protocol) to forward packets addressed to neighbor packet switching device 106 towards packet switching device 102 in the ring topology of network 100 (and therefore through particular packet switching devices 102 and 101 to neighbor packet switching device 106). Intermediate packet switching device 104 is configured (e.g., via a link state routing protocol) to forward packets addressed to neighbor packet switching device 106 towards packet switching device 105 in the ring topology of network 100 (and therefore through particular packet switching device 105 to neighbor packet switching device 106).

In one embodiment, each of packet switching devices 101-106 operate a link-state routing protocol (e.g., Open Shortest Path First (OSPF) or Intermediate System to Intermediate System (IS-IS)) to understand the connectivity of network 100, which is used to determine how to forward packets in network 100.

When particular communications 111 fails or is otherwise taken out of service (e.g., for maintenance purposes), data packets being forwarded to neighbor packet switching device 106 (and possibly to other packet switching devices) through particular packet switching device 101 are traveling around the ring topology of network 100 towards the failure as particular packet switching device 101 is no longer communicatively coupled to neighbor packet switching device 106 via particular communications 111. Hence, to reach neighbor packet switching device 106 with particular communications 111 out of service, data packets should be sent around the ring topology of network 100 in the direction away from particular packet switching device 101/failed particular communications 111. However, the convergence of forwarding information in network 100 is not immediate in response to a change in the topology of network 100, such as in response to a failure of particular communications 111.

In response to this failure, a prior packet switching device (in the position of packet switching device 101) would send out link state information designating that particular communications 111 was no longer available, and this updated link state information would propagate around network 100 in a counter-clockwise direction, with packet switching devices serially updating their forwarding tables and forwarding the link state information. Prior systems communicate link state information in link state packets which are exchanged between only neighboring packet switching devices. Thus, for example, a prior first packet switching device in the position of packet switching device 103 in network 100 could be still sending packets to a prior second packet switching device in the position of packet switching device 102 in network 100, with the second packet switching device forwarding these packets back to the first packet switching device. This is called a micro-loop condition, as packets are being looped back to a previously sending packet switching device.

To avoid micro-loops in one embodiment, particular packet switching device 101 will communicate the link state information concerning the unavailability of particular communications 111 to a packet switching device that is already configured to forward packets addressed to neighbor packet switching device 106, but not through particular packet switching device 101. From there, this link state information concerning particular communications 111 will normally propagate between neighboring packet switching devices through network 100. In this manner, packet switching devices will typically be updated in an order to avoid one or more micro-loops.

Further, packet switching device 101 of one embodiment advertises that this link state information as being a very large cost (e.g., maxCost−1) of the now unavailable particular communications 111, rather than being in a failed condition which would be considered by a packet switching device that particular communications 111 failed in both directions. Subsequently, such as in response to receipt of this link state information or in response to the expiration of a time period, packet switching device 101 will advertise that failure of this particular communications 111 via standard link state protocol message(s).

For example, particular packet switching device 101 recognizes that particular communications 111 is no longer available. In response, particular packet switching device 101 communicates link state information, that the cost of particular communications 111 (for the direction of packet switching device 101 to 106) to be maxCost−1, to any of packet switching devices 104-106. Because each of packet switching devices 104-106 is configured to forward packets to packet switching device 106 not through particular packet switching device 101, or is packet switching device 106, the normal propagation of link state information will not result in a micro-loop (as long as the packet switching devices update their forwarding information before a next packet switching device updates its forwarding information concerning the high cost of particular communications 111).

Similarly, neighbor packet switching device 106 recognizes that particular communications 111 is no longer available. In response, neighbor packet switching device 106 communicates link state information, that the cost of particular communications 111 (for the direction of packet switching device 106 to 101) to be maxCost−1, to any of packet switching devices 101-103. Because each of packet switching devices 101-103 is configured to forward packets to packet switching device 101 not through particular packet switching device 106, or is packet switching device 101, the normal propagation of link state information will not result in a micro-loop (as long as the packet switching devices update their forwarding information before a next packet switching device updates its forwarding information concerning the high cost of particular communications 111).

Figure 2:
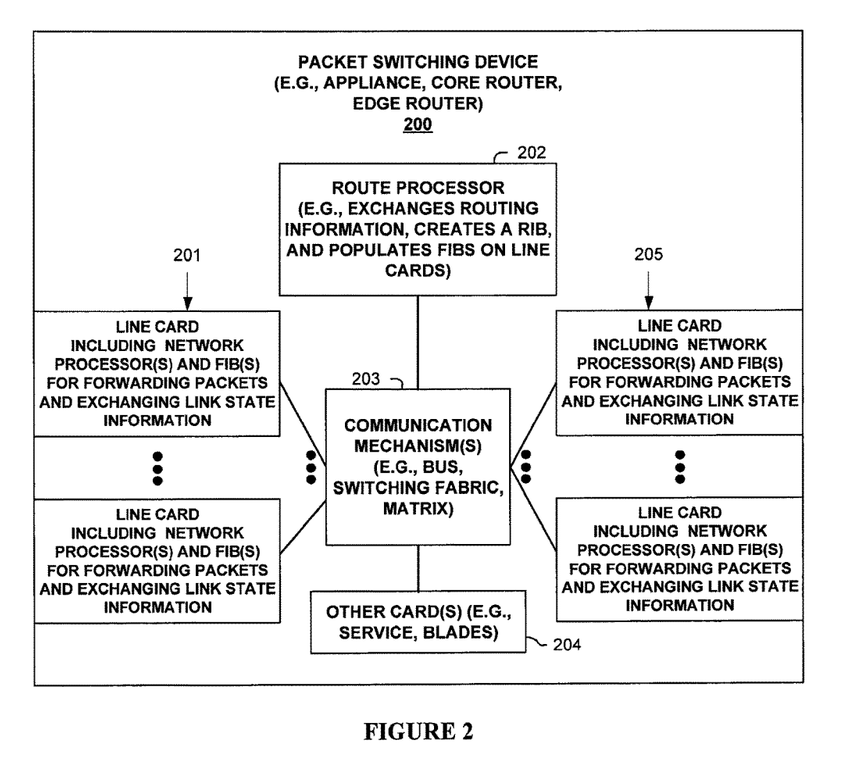
FIG. 2 illustrates a packet switching device configured to operate, and/or operating, according to one embodiment.

One embodiment of packet switching device 200 (e.g., appliance, core router, edge router) is illustrated in FIG. 2. As shown, packet switching device 200 includes line cards 201 and 205, each with one or more FIBs for use in forwarding packets. Additionally, packet switching device 200 also has a route processor 202, which typically manages the control plane by communicating routing information (e.g., exchanging link state information) with other packet switching devices, populates one or more RIBs, and populates one or more FIBs in line cards 201 and 205 for use in communicating packets. Packet switching device 200 also includes other cards 204 (e.g., service cards, blades), and some communication mechanism 203 (e.g., bus, switching fabric, matrix) for allowing its different entities 201, 202, 204 and 205 to communicate.

Figure 3:
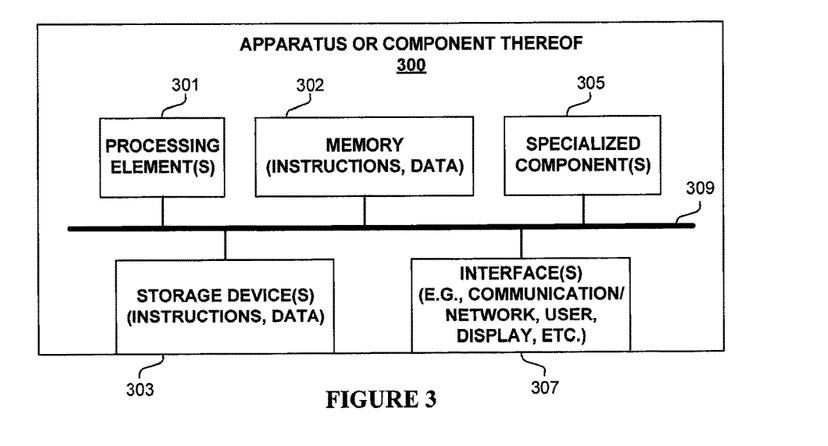
FIG. 3 illustrates an apparatus or component configured to operate, and/or operating, according to one embodiment.

FIG. 3 is a block diagram of an apparatus or component 300 used in one embodiment. One embodiment includes one or more packet switching devices, and/or one or more packet switching devices configured to operate, or actually operating, in a network. In one embodiment, apparatus or component 300 performs one or more processes corresponding to one of the flow diagrams illustrated or otherwise described herein, and/or illustrated in another diagram or otherwise described herein.

In one embodiment, apparatus or component 300 includes one or more processing element(s) 301, memory 302 (e.g., one or more memories), storage device(s) 303, specialized component(s) 305 (e.g. optimized hardware such as for converting addresses, performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of a particular application. In one embodiment, apparatus or component 300 corresponds to, or is part of, a packet switching device 101-106 of FIG. 1.

Various embodiments of apparatus or component 300 may include more or fewer elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 5:
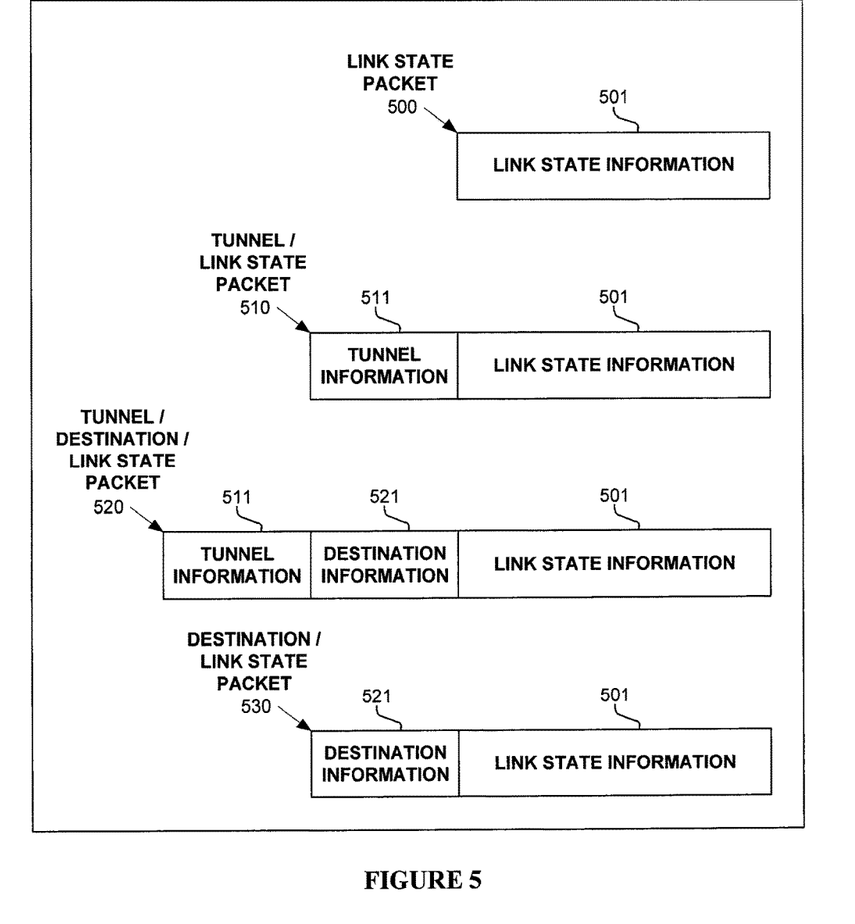
FIG. 5 illustrates different packets used to exchange link state information in one embodiment.

Briefly, illustrated in FIG. 5 are generalizations of four different packets possibly used in one embodiment to communicate link state information 501 between packet switching devices. A basic link state packet 500 is shown which includes link state information 501. Also, shown is a tunnel/link state packet 510 which is used in one embodiment to tunnel link state information 501 to a packet switching device. Tunnel information 511 is used to represent information typically included in a header of a packet being tunneled, with tunnel information being such as, but not limited to Multiprotocol Label Switching (MPLS) label(s), Internet Protocol (IP) address(es), and/or other forwarding information. Also, shown is a tunnel/destination/link state packet 520 which is used in one embodiment to tunnel a packet including destination information 521 and link state information 501 to a packet switching device. This packet switching device will then send a destination/link state packet 530 including link state information 501 to a destination packet switching device identified by destination information 521 (e.g., MPLS label(s), IP address, and/or other forwarding information, etc.). In one embodiment, destination/link state packet 530 is used to communicate link state information 501 from a particular packet switching device to an intermediate packet switching device identified by destination information 521.

Figure 4:
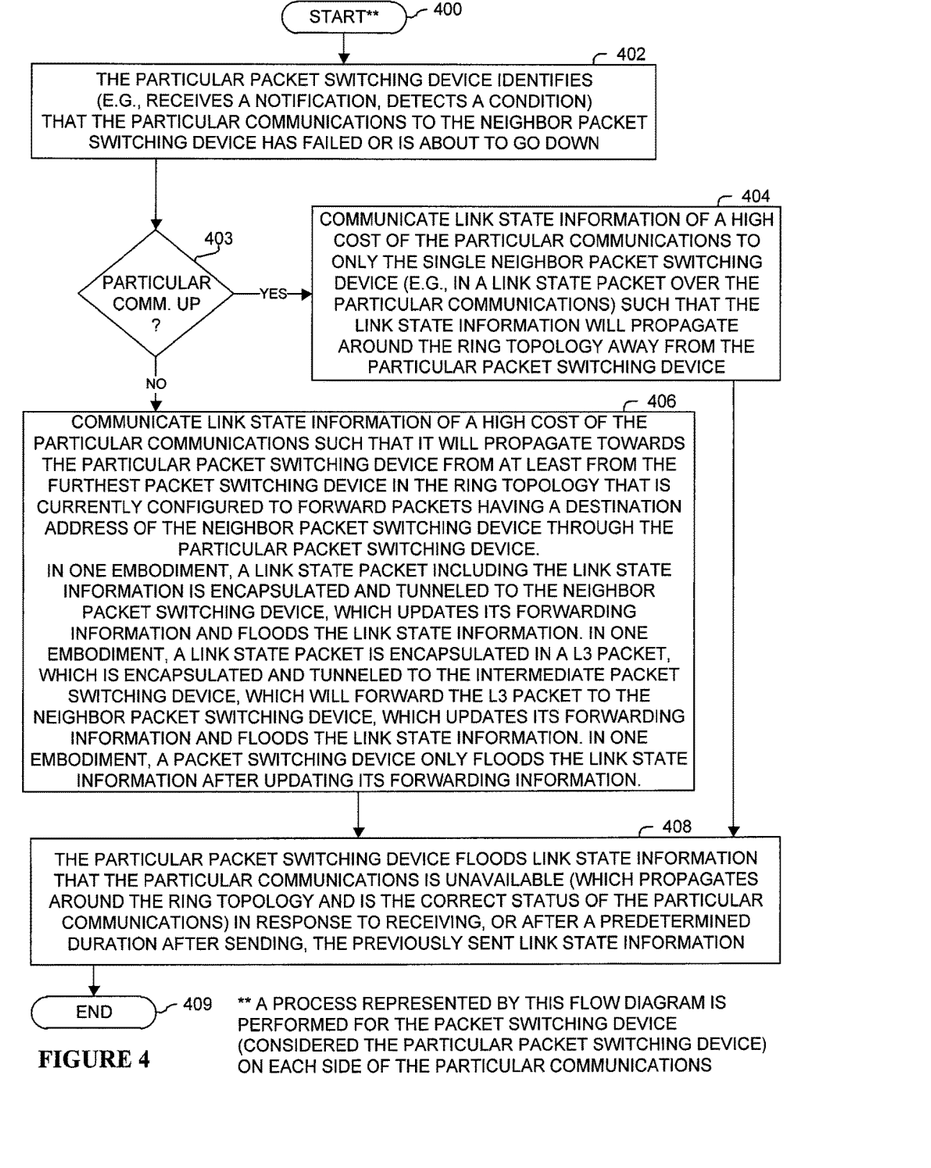
FIG. 4 illustrates a process configured to be performed, and/or performed, in one embodiment.

FIG. 4 illustrates a process configured to be performed, and/or performed, in one embodiment. Processing begins with process block 400. Note, the process illustrated by FIG. 4 is performed by each particular packet switching device of the packet switching devices on both sides of the particular communications which has failed or to be taken out of service.

In process block 402, the particular packet switching device identifies (e.g., receives a notification, detects a condition) that the particular communications to the neighbor packet switching device has failed or is about to go down.

As determined in process block 403, if the particular communications is still up (e.g., it will be taken down shortly), then, in process block 404, the particular packet switching device directly communicates to, and only to, the neighbor packet switching device of the high cost of the particular communications (e.g., from the particular to the neighbor packet switching device). This link state information will therefore propagate around the packet switching devices in the ring topology in a order to avoid micro loops. FIG. 5 illustrates a link state packet 500 used to communicate link state information 501 in one embodiment.

Otherwise as determined in process block 403 of FIG. 4, the particular communications has failed. In process block 406, the particular packet switching device communicates link state information of a high cost of the particular communications (e.g., in the direction from particular to neighbor packet switching devices) such that it will propagate towards the particular packet switching device from at least from the furthest packet switching device in the ring topology that is currently configured to forward packets having a destination address of the neighbor packet switching device not through the particular packet switching device. In one embodiment, the particular packet switching device uses a packet 510, 520 or 530 (of FIG. 5) to communicate this link state information.

In one embodiment, the particular link state information is marked using a type-length-value field (TLV) or via some other mechanism to inform the packet switching device receiving this link state information that it corresponds to information to be updated in a manner to prevent or minimize micro-loops. Based on this marking, a packet switching device might delay the further flooding of this particular link state information to another packet switching device until it has updated the contents of its forwarding information to reflect the high cost of the particular communications (e.g., link). If all packet switching devices in the ring topology delay flooding until its respective forwarding information has been updated, this ensures that even where individual packet switching devices process the information and update their forwarding information at different speeds, the correct ordering of the forwarding information updating for minimizing or elimination micro loops will be maintained.

As the particular packet switching device of one embodiment advertised a high-cost of the particular communications which is technically not correct information, in process block 408 of FIG. 4, the particular packet switching device floods link state information that the particular communications is unavailable (which propagates around the ring topology and is the correct status of the particular communications) in response to receiving, or after a predetermined duration after sending, the previously sent link state information. In one embodiment, the particular packet switching device identifies that it has received the previously sent link state information based on a sequence number associated with the previously sent link state information, or via some other mechanism. Processing of the flow diagram of FIG. 4 is complete as indicated by process block 409.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
performing operations in a network including bi-directional communicating packets according to a ring topology by a plurality of packet switching devices, with the plurality of packet switching devices including a particular packet switching device, a first neighbor packet switching device, and a non-neighbor packet switching device, with the particular packet switching device and the first neighbor packet switching device being neighbors in the ring topology via particular communications when active, and with said operations including:
generating, by the particular packet switching device, a particular packet including particular link state information identifying an unavailability of said particular communications; and
sending through the ring topology, by the particular packet switching device to the non-neighbor packet switching device the particular packet causing link state information advertising a high cost of said particular communication to initially propagate neighbor-by-neighbor through the ring topology not from the particular packet switching device but rather neighbor-by-neighbor through the ring topology from the non-neighbor packet switching device including away from the non-neighbor packet switching device towards the particular packet switching device;
wherein the particular packet switching device selectively sends said particular link state information identifying the unavailability of said particular communications to only a single packet switching device of the plurality of packet switching devices in the ring topology that is not a current neighbor of the particular packet switching device, with the single non-neighbor packet switching device being the non-neighbor packet switching device that is a packet switching device furthest away from the particular packet switching device in the ring topology in the direction not through said particular communications with forwarding information to send packets addressed to the first neighbor packet switching device through the particular packet switching device.

2. The method of claim 1, wherein forwarding information in the non-neighbor packet switching device directs the non-neighbor packet switching device to send packets addressed to the first neighbor packet switching device in the direction not through the particular packet switching device in the ring topology.

3. The method of claim 2, wherein the non-neighbor packet switching device is a closest packet switching device to the particular packet switching device in the ring topology in the direction not through said particular communications.

4. The method of claim 1, wherein said particular link state information of unavailability advertises said particular communications as being a very large cost.

5. The method of claim 1, comprising:
processing, by the non-neighbor packet switching device, said particular link state information to update forwarding information of the non-neighbor packet switching device; and
flooding, by the non-neighbor packet switching device, said particular link state information to each of its neighbor packet switching devices in the ring topology.

6. The method of claim 1, comprising: flooding, by the particular packet switching device link state information identifying an unavailability of particular communications to a neighbor packet switching device in the ring topology, after a predetermined time duration after said sending the particular packet to the non-neighbor packet switching device, with the predetermined time duration selected to allow for said particular link state information to said initially propagate neighbor-by-neighbor through the ring topology to the particular packet switching device.

7. The method of claim 1, including flooding by the particular packet switching device link state information identifying an unavailability of particular communications to a neighbor packet switching device in the ring topology in response to the particular packet switching device receiving said particular link state information from a neighbor packet switching device in the ring topology that was said initially propagated neighbor-by-neighbor through the ring topology from the non-neighbor packet switching device.

8. The method of claim 1, wherein said generating and sending operations are performed in response to said particular communications being no longer available between the particular packet switching device and the first neighbor packet switching device.

9. The method of claim 1, wherein said sending the particular packet is performed using a tunnel from the particular packet switching device to the non-neighbor packet switching device, with the tunnel following the ring topology while not passing through said particular communications.

10. A particular packet switching device, comprising:
one or more processing elements;
memory;
a plurality of interfaces sending and receiving packets; and
one or more packet switching mechanisms packet switching packets among said interfaces;
wherein the particular packet switching device performs operations, with said operations including:
generating a particular packet including tunnel information, and with the particular packet including particular link state information identifying an unavailability of particular communications in a network of a plurality of packet switching devices communicating bi-directionally in and according to a ring topology, with the particular packet switching device and a first neighbor packet switching device being neighbors in the ring topology via said particular communications when active and not neighbors in the ring topology when said particular communications is unavailable; and
sending, via a tunnel not passing through said particular communications based on said tunnel information through the ring topology to a non-neighbor packet switching device in the ring topology when said particular communications is unavailable, the particular packet causing link state information advertising a high cost of said particular communication to initially propagate neighbor-by-neighbor through the ring topology not from the particular packet switching device but rather neighbor-by-neighbor through the ring topology away from the non-neighbor packet switching device including in neighbor-exchanged link state information away from the non-neighbor packet switching device towards the particular packet switching device in the direction that is not through said particular communications.

11. The particular packet switching device of claim 10, wherein forwarding information in the non-neighbor packet switching device directs the non-neighbor packet switching device to send packets addressed to the first neighbor packet switching device in the direction not through the particular packet switching device in the ring topology.

12. The particular packet switching device of claim 10, wherein the non-neighbor packet switching device is a packet switching device furthest away from the particular packet switching device in the ring topology in the direction not through said particular communications with forwarding information to send packets addressed to the first neighbor packet switching device through the particular packet switching device.

13. The particular packet switching device of claim 10, wherein said particular link state information of unavailability advertises said particular communications as being a very large cost.

14. A method, comprising:
generating, by a particular packet switching device, a particular packet including tunnel information, and with the particular packet including particular link state information identifying a high cost of particular communications between a first neighbor packet switching device and the particular packet switching device in a ring topology, wherein the particular packet switching device and the first neighbor packet switching device are two of a plurality of packet switching devices in a network communicating bi-directionally according to the ring topology, with the particular packet switching device and the first neighbor packet switching device being neighbors in the ring topology via said particular communications when active; and wherein each of the plurality of packet switching devices exchanges link state information with their current neighbors in the ring topology and updates their respective local forwarding information accordingly; and
sending, by the particular packet switching device via a tunnel not passing through said particular communications based on said tunnel information through the ring topology to an intermediate packet switching device of the plurality of packet switching devices in the ring topology and which is not a neighbor of the particular packet switching device in the ring topology when said particular communications is unavailable, the particular packet causing link state information advertising a high cost of said particular communication to initially propagate neighbor-by-neighbor through the ring topology not from the particular packet switching device but rather neighbor-by-neighbor through the ring topology from the intermediate packet switching device including in neighbor-exchanged link state information away from the intermediate packet switching device towards the particular packet switching device in the direction that is not through said particular communications.

15. The method of claim 14, wherein forwarding information in the intermediate packet switching device directs the intermediate packet switching device to send packets addressed to the first neighbor packet switching device in the direction not through the particular packet switching device in the ring topology.

16. The method of claim 14, wherein the intermediate packet switching device is a packet switching device furthest away from the particular packet switching device in the ring topology in the direction not through said particular communications with forwarding information to send packets addressed to the first neighbor packet switching device through the particular packet switching device.

* * * * *